United States Patent
Song et al.

(10) Patent No.: US 8,685,207 B2
(45) Date of Patent: Apr. 1, 2014

(54) FINELY DIVIDED STARCH-CONTAINING POLYMER DISPERSIONS, METHOD FOR THE PRODUCTION THEREOF AND USE THEREOF AS SIZING AGENT IN PAPER MANUFACTURING

(75) Inventors: Anja Song, Mannheim (DE); Holger Kern, Kirchardt (DE); Petra Arnold, Birkenau (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 13/498,734

(22) PCT Filed: Sep. 28, 2010

(86) PCT No.: PCT/EP2010/064357
§ 371 (c)(1),
(2), (4) Date: Mar. 28, 2012

(87) PCT Pub. No.: WO2011/039185
PCT Pub. Date: Apr. 7, 2011

(65) Prior Publication Data
US 2012/0180970 A1    Jul. 19, 2012

(30) Foreign Application Priority Data

Oct. 2, 2009   (EP) ..................................... 09172098

(51) Int. Cl.
| | |
|---|---|
| *D21H 17/28* | (2006.01) |
| *D21H 19/54* | (2006.01) |
| *D21H 17/37* | (2006.01) |
| *D21H 19/20* | (2006.01) |
| *D21H 19/56* | (2006.01) |
| *D21H 17/35* | (2006.01) |
| *C08F 212/08* | (2006.01) |
| *C08F 2/22* | (2006.01) |
| *C08F 251/00* | (2006.01) |

(52) U.S. Cl.
USPC ........ 162/168.1; 162/175; 427/395; 524/734; 526/329.2; 526/200

(58) Field of Classification Search
USPC ............... 162/168.1, 169, 175; 524/732–734, 524/832, 845; 526/200, 329.2; 427/361, 427/391, 395; 525/333.3
See application file for complete search history.

(56) References Cited

U.S. PATENT DOCUMENTS

| 6,426,381 | B1 * | 7/2002 | Konig et al. ................... 524/734 |
| 2008/0255301 | A1 | 10/2008 | Gaschler et al. |
| 2009/0139675 | A1 * | 6/2009 | Stein et al. ................. 162/164.6 |
| 2010/0069597 | A1 * | 3/2010 | Venkatesh et al. ............ 527/312 |
| 2010/0236736 | A1 | 9/2010 | Brockmeyer et al. |

FOREIGN PATENT DOCUMENTS

| EP | 0 257 412 | 3/1988 |
| EP | 0 273 770 | 7/1988 |
| EP | 0 276 770 A2 | 8/1988 |
| JP | 4-325509 | * 11/1992 |
| JP | 7-118313 | * 5/1995 |
| WO | 99 42490 | 8/1999 |
| WO | WO 99/42490 | 8/1999 |
| WO | 02 14393 | 2/2002 |
| WO | WO 02/14393 | 2/2002 |
| WO | 2004 078807 | 9/2004 |
| WO | 2007 000419 | 1/2007 |
| WO | 2007 000420 | 1/2007 |
| WO | WO 2007/000419 | 1/2007 |
| WO | WO 2007/000420 | 1/2007 |

OTHER PUBLICATIONS

International Search Report Issued Mar. 30, 2011 in PCT/EP10/64357 Filed Sep. 28, 2010.

"Terpenes", Römpp Chemie Lexikon, 9$^{th}$ Extended and Revised Edition, Georg Thieme Verlag Stuttgart, 1989-1992, 6 pages plus English-language translation.

Michael Ash, et al., "Handbook of Industrial Surfactants", Synapse Information Resources, Fourth Edition, vol. 1, 2005, p. 443 plus cover page.

* cited by examiner

*Primary Examiner* — Eric Hug
(74) *Attorney, Agent, or Firm* — Oblon, Spivak, McClelland, Maier & Neustadt, L.L.P.

(57) ABSTRACT

Finely divided, starch-containing polymer dispersions which are obtainable by free radical emulsion polymerization of ethylenically unsaturated monomers in the presence of at least one redox initiator and starch,
(a) from 30 to 60% by weight of at least one optionally substituted styrene,
(b) from 1 to 60% by weight of at least one $C_1$-$C_{12}$-alkyl acrylate and/or $C_1$-$C_{12}$-alkyl methacrylate,
(c) from 0 to 10% by weight of at least one other ethylenically unsaturated copolymerizable monomer,
being used as ethylenically unsaturated monomers and
(d) from 15 to 40% by weight of at least one degraded starch which has a molar mass $M_w$ of from 1000 to 65 000 g/mol being used as the starch,
the sum (a)+(b)+(c)+(d) being 100% and being based on the total solids content, and the polymerization being carried out in the presence of at least 0.01% by weight, based on the monomers used, of at least one terpene-containing chain-transfer agent, processes for the preparation of the finely divided, starch-containing polymer dispersions by emulsion polymerization of the monomers (a), (b) and (c) with redox initiators in the presence of (d) degraded starch and at least 0.01% by weight, based on the monomers used, of at least one terpene-containing chain-transfer agent, and use of the finely divided, starch-containing polymer dispersions as sizes for paper, board and cardboard.

20 Claims, No Drawings

FINELY DIVIDED STARCH-CONTAINING POLYMER DISPERSIONS, METHOD FOR THE PRODUCTION THEREOF AND USE THEREOF AS SIZING AGENT IN PAPER MANUFACTURING

The invention relates to finely divided, starch-containing polymer dispersions which are obtainable by emulsion polymerization of ethylenically unsaturated monomers in the presence of at least one redox initiator, starch and a terpene-containing chain-transfer agent, processes for the preparation of the dispersions and their use as sizes and coating materials for paper.

EP 0 276 770 B1 and EP 0 257 412 B2 disclose sizes based on finely divided, aqueous dispersions which are obtainable by copolymerization of ethylenically unsaturated monomers, such as acrylonitrile and (meth)acrylates and optionally up to 10% by weight of other monomers, such as styrene, by an emulsion polymerization in the presence of initiators comprising peroxide groups, in particular of redox initiators, and degraded starch. The use of chain-transfer agents, such as terpenes, is not disclosed in any of the documents.

WO 99/42490 A1 likewise discloses aqueous, finely divided polymer dispersions which are used for the surface sizing of paper, board and cardboard. The dispersions are obtainable by free radical emulsion polymerization of ethylenically unsaturated monomers in the presence of degraded starch having a number average molecular weight $M_n$ of from 500 to 10 000. The monomers consist of (i) at least one optionally substituted styrene, (ii) at least one $C_1$-$C_4$-alkyl (meth)acrylate and (iii) optionally up to 10% by weight of other ethylenically unsaturated monomers. The polymerization is effected in the presence of a graft-linking, water-soluble redox system. The use of chain-transfer agents from the group consisting of the mercaptans is disclosed for adjusting the molecular weight.

WO 2002/14393 A1 discloses a process for the preparation of polymer dispersions which are used as sizes and coating materials. These polymer dispersions are obtainable by emulsion copolymerization of a monomer mixture comprising at least one (meth)acrylate of monohydric, saturated $C_3$-$C_8$-alcohols an at least one further ethylenically unsaturated monomer in the presence of a starch or of a starch derivative and of an initiator comprising peroxide groups. The emulsion polymerization is distinguished in that both the monomers and the initiator are metered in continuously, a first amount of initiator being metered in a first feed period of from 5 to 60 minutes and a second amount of initiator which is smaller than the first amount of initiator being metered in a second feed period of from 5 to 180 minutes. The use of chain-transfer agents is not disclosed.

Finely divided, starch-containing polymer dispersions as sizes for paper, board and cardboard are also disclosed in WO 2007/000419 A1. These are obtainable by emulsion polymerization, in an aqueous medium, using redox initiators, of ethylenically unsaturated monomers comprising (i) at least one optionally substituted styrene, methyl methacrylate, acrylonitrile and/or methacrylonitrile, (ii) at least one $C_1$-$C_{12}$-alkyl (meth)acrylate and at least (iii) one ethylenically unsaturated copolymerizable monomer in the presence of a degraded, cationic starch which has a molar mass $M_w$ of from 1000 to 65 000 g/mol. The disclosure comprises a multiplicity of chain-transfer agents but the example according to the invention is carried out without a chain transfer agent.

WO 2007/000420 A1 likewise discloses finely divided, aqueous, starch-containing polymer dispersions as sizes for paper, board and cardboard, which are obtainable by free radical emulsion polymerization of (i) at least one optionally substituted styrene, methyl methacrylate, acrylonitrile and/or methacrylonitrile, (ii) at least one $C_1$-$C_4$-alkyl methacrylate, (iii) at least one $C_5$-$C_{22}$-alkyl (meth)acrylate and (iv) optionally at least one other ethylenically copolymerizable monomer and (v) a degraded starch having a molar mass $M_w$ of from 1000 to 65 000 in the presence of a chain-transfer agent. The description discloses a multiplicity of potential chain-transfer agents but tert-dodecyl merpatan is the preferred chain-transfer agent, which is also used in all examples.

However, there is a continuous need in the paper industry for novel, efficient engine sizes and surface sizes for the production of paper, board and cardboard.

It was therefore the object of the present invention to provide further finely divided, starch-containing polymer dispersions, which, compared with the known polymer dispersions, have an improved efficiency as sizes for paper, board and cardboard.

The object is achieved, according to the invention, by finely divided, starch-containing polymer dispersions which are obtainable by free radical emulsion polymerization of ethylenically unsaturated monomers in the presence of at least one redox initiator and starch, (a) from 30 to 60% by weight of at least one optionally substituted styrene,
(b) from 1 to 60% by weight of at least one $C_1$-$C_{12}$-alkyl acrylate and/or $C_1$-$C_{12}$-alkyl methacrylate,
(c) from 0 to 10% by weight of at least one other ethylenically unsaturated copolymerizable monomer being used as the ethylenically unsaturated monomers and
(d) from 15 to 40% by weight of at least one degraded starch which has a molar mass M, of from 1000 to 65 000 g/mol, being used as the starch, the sum (a)+(b)+(c)+(d) being 100% and being based on the total solids content, and the polymerization being carried out in the presence of at least 0.01% by weight, based on the monomers used, of at least one terpene-containing chain-transfer agent.

The finely divided, starch-containing polymer dispersions according to the invention are distinguished by a significantly increased sizing effect with respect to the prior art in the production of paper, board and cardboard.

Monomers of group (a) are optionally substituted styrenes. This group includes styrene and substituted styrenes, such as, for example, α-methylstyrene, styrenes halogenated on the ring, such as chlorostyrene, or $C_1$-$C_4$-alkyl-substituted styrenes, such as vinyltoluene. Of course, mixtures of optionally substituted styrenes can also be used. A preferably used monomer of this group is styrene, which is preferably used alone from this group.

The monomers of group (a) are present in an amount of from 30 to 60% by weight, preferably from 40 to 50% by weight, in the reaction mixture comprising (a), (b), (c) and (d).

Suitable monomers of group (b) are all esters of acrylic acid and of methacrylic acid which are derived from monohydric $C_1$-$C_{12}$-alcohols, such as methyl acrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, sec-butyl acrylate, sec-butyl methacrylate, n-pentyl acrylate, n-pentyl methacrylate, neopentyl acrylate, neopentyl methacrylate, cyclohexyl acrylate, cyclohexyl methacrylate, 2-hexyl acrylate, 2-hexyl methacrylate, 2-ethylhexyl acrylate, 2-ethylhexyl methacrylate, n-octyl acrylate, n-octyl methacrylate, isooctyl acrylate, isooctyl methacrylate, decyl acrylate and decyl methacrylate, dodecyl acrylate, dodecyl methacrylate, 2-propylheptyl acrylate and 2-propylheptyl methacrylate. Preferably used monomers of this group are esters of acrylic acid and methacrylic acid with $C_1$-$C_8$-alcohols, such as methyl acrylate, ethyl acrylate, n-propyl acrylate, isopropyl acrylate, n-butyl acrylate, sec-butyl acrylate, isobutyl acrylate, tert-butyl acrylate, cyclohexyl acrylate, 2-ethylhexyl acrylate and 2-ethylhexyl methacrylate. The esters of acrylic acid with $C_1$-$C_4$-alcohols, such as n-butyl acrylate, sec-butyl acrylate, isobutyl acrylate and tert-butyl acrylate are very particularly preferred.

According to the invention, at least one $C_1$-$C_{12}$-alkyl acrylate and/or $C_1$-$C_{12}$-alkyl methacrylate is used as a monomer of group (b), for example two or more of the abovementioned esters in any desired mixtures with one another. Preferably only one monomer from the group (b) is used as a monomer of the group and particularly preferably a monomer from the group consisting of the esters of acrylic acid with $C_1$-$C_4$-alcohols.

The monomers of group (b) are present in an amount of from 1 to 60% by weight in the reaction mixture comprising (a), (b), (c) and (d), preferably in amounts of from 1 to 29% by weight and particularly preferably in amounts of from 5 to 25% by weight.

In order to modify the polymers, the polymerization can optionally be carried out in the presence of at least one further monomer (c). Suitable monomers (c) are in principle all monomers which differ from the monomers (a) and (b). Examples of such monomers are vinyl acetate, vinyl propionate, hydroxyethyl acrylate, hydroxyethyl methacrylate, N-vinylformamide, acrylamide, methacrylamide, N-vinylpyrrolidone, N-vinylimidazole, N-vinylcaprolactam, acrylic acid, methacrylic acid, acrylamidomethylpropanesulfonic acid, styrenesulfonic acid, vinylsulfonic acid and salts of the monomers comprising acid groups. The acidic monomers can be used in partly or completely neutralized form. Neutralizing agents used are, for example, sodium hydroxide solution, potassium hydroxide solution, sodium carbonate, sodium bicarbonate, calcium hydroxide and ammonia.

Further examples of monomers (c) are dialkylaminoalkyl (meth)acrylates and dialkylaminoalkyl(meth)acrylamides, such as dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, dimethylaminoethylacrylamide, dimethylaminoethylmethacrylamide, dimethylaminopropylacrylamide and dimethylaminopropylmethacrylamide. The basic monomers can be used in the form of the free bases, as salts with the organic acids or mineral acids or in quaternized form in the polymerization.

In addition, vinyl esters of linear or branched $C_1$-$C_{30}$-carboxylic acids are suitable as monomers of group (c). Such carboxylic acids are saturated and straight-chain, such as formic acid, acetic acid, propionic acid, butyric acid, valeric acid, caproic acid (hexanoic acid), heptanoic acid, caprylic acid (octanoic acid), pelargonic acid, capric acid (decanoic acid), undecanoic acid, lauric acid (dodecanoic acid), tridecanoic acid, myristic acid (tetradecanoic acid), pentadecanoic acid, palmitic acid, margaric acid, stearic acid, nonadecanoic acid, arachidic acid, behenic acid, lignoceric acid (tetracosanoic acid), cerotic acid, melissic acid (triacontanoic acid). According to the invention, saturated, branched carboxylic acids, such as, isobutyric acid, isovaleric acid (3-methylbutyric acid) and tuberculostearic acid, and strongly branched saturated carboxylic acids are also suitable. The latter are known by the term versatic acids, such as, for example, pivalic acid, neohexanoic acid, neoheptanoic acid, neooctanoic acid, neononanoic acid and neodecanoic acid. Suitable vinyl esters of linear or branched $C_1$-$C_{30}$-carboxylic acids are, for example, vinyl laurate, vinyl stearate, vinyl propionate, vinyl versatate, vinyl acetate, vinyl propylheptanoate, vinyl neodecanoate (VeoVA® 10 from Hexion Specialty Chemicals), vinyl neononanoate (VeoVa® 9 from Hexion Specialty Chemicals) and vinyl pelargonate.

Of course, any desired mixtures of said monomers (c) can be used.

The monomers of group (c) are present in an amount of from 0 to 10% by weight in the reaction mixture comprising the components (a), (b), (c) and (d). If they are used for modifying the polymers, the preferably used amounts are from 0.1 to 5% by weight, based on the reaction mixture comprising the components (a), (b), (c) and (d).

The polymerization of the monomers is effected in the presence of a degraded starch as component (d), which has a molar mass $M_w$ of from 1000 to 65 000 g/mol. The average molecular weights $M_w$ of the degraded starches can easily be determined by methods known to the person skilled in the art, for example by means of gel permeation chromatography with the use of a multiangle light scattering detector.

In order to obtain such a starch, it is possible to start from all starch types, for example from starch from potatoes, corn, wheat, rice, tapioca, peas, sorghum or wax starches, which have a content of amylopectin of >80, preferably >95, % by weight, such as waxy corn starch and waxy potato starch. The starches can be anionically and/or cationically modified, esterified, etherified and/or crosslinked. Anionic starches are preferred.

If the molecular weight $M_w$ of the starches is not already in the range from 1000 to 65 000 g/mol, they are subjected to an increase in molecular weight before the beginning of the polymerization or in a separate step. A procedure in which a starch is enzymatically and/or oxidatively degraded before the beginning of the polymerization is preferred. The molar mass $M_w$ of the degraded starch is preferably in the range from 2500 to 35 000 g/mol.

In the case of cationized starches, these are prepared, for example, by reacting native starch with at least one quaternizing agent, such as 2,3-epoxypropyltrimethyl-ammonium chloride. The cationized starches comprise quaternary ammonium groups.

In the case of anionic starches, these are obtained, for example, by oxidative reaction of the native starch with a suitable oxidizing agent, such as sodium hypochlorite or periodate.

The proportion of cationoic or anionic groups in the substituted starch is stated with the aid of the degree of substitution (DS). It is, for example, from 0.005 to 1.0, preferably from 0.01 to 0.4.

All starches can be used. The degradation of the starches is preferably effected before the polymerization of the monomers but can also be carried out during the polymerization of the monomers. It can be carried out oxidatively, thermally, acidolytically or enzymatically. Preferably, the starch degradation is effected enzymatically and/or oxidatively directly before the beginning of the emulsion polymerization in the apparatus in which the polymerization is to be carried out or in a separate step. It is possible to use a single degraded starch or mixtures of two or more degraded starches in the polymerization.

The starch is present in the reaction mixture comprising the components (a), (b), (c) and (d) in an amount of from 15 to 40% by weight, preferably from 25 to 35% by weight.

The finely divided starch-containing polymer dispersions according to the invention are obtainable by carrying out the polymerization in the presence of at least 0.01% by weight, based on the monomers used, of at least one terpene-containing chain-transfer agent.

In the context of the present invention, terpene-containing chain-transfer agents are understood as meaning those hydrocarbons which are composed of isoprene units [$H_2C=C(CH_3)-CH=CH_2$] and can consequently be derived from the isoprene rule. Terpenes are divided into monoterpenes ($C_{10}$), sesquiterpenes ($C_{15}$), diterpenes ($C_{20}$), sesterterpenes ($C_{25}$), triterpenes ($C_{30}$) and tetraterpenes ($C_{40}$) and polyterpenes ($>C_{40}$), substantially into acyclic, monocyclic, bicyclic and tricyclic terpenes. Terpenes are known to a person skilled in the art, for example from Römpp Chemie Lexikon, 9th extended and revised edition, 1989-1992, Georg Thieme Verlag Stuttgart.

In the narrower sense, terpenes are understood as meaning hydrocarbons having a $C_{10}H_{16}$ skeleton, and the hydrogenation and dehydrogenation derivatives thereof and the alcohols, ketones, aldehydes and esters derived therefrom.

According to the invention, monocyclic monoterpenes are preferably used, particularly preferably diunsaturated monocyclic monoterpenes (so-called p-menthadienes). Examples of diunsaturated monocyclic monoterpenes are α-, β- and γ-terpinene, terpinolene, (+)-(S)-α-phellandrene, (−)-(S)-α-phellandrene and limonene. α-terpinene and terpinolene are preferred and terpinolene is particularly preferred.

Of course, mixtures of said terpene-containing chain-transfer agents can also be used, but preferably only one terpene-containing chain-transfer agent is used, particularly preferably only terpinolene is used.

The terpene-containing chain-transfer agents are used in the polymerization in an amount of at least 0.01% by weight, based on the monomers. The amounts depend substantially on the efficiency of the chain-transfer agent or chain-transfer agents used in each case. They are usually in the range from 0.01 to 10% by weight, preferably from 0.05 to 5.0% by weight, based on the monomers (a), (b) and (c).

In order to initiate the polymerization, a redox initiator is used according to the invention. Said redox initiators are preferably graft-linking, water-soluble redox systems, for example comprising hydrogen peroxide and a heavy metal salt or comprising hydrogen peroxide and sulfur dioxide or comprising hydrogen peroxide and sodium metabisulfite. Further suitable redox systems are combinations of tert-butyl hydroperoxide/sulfur dioxide, sodium or potassium persulfate/sodium bisulfite, ammonium persulfate/sodium bisulfite or ammonium persulfate/iron(II) sulfate. Preferably, hydrogen peroxide is used in combination with a heavy metal salt, such as iron(II) sulfate. Frequently, the redox system additionally comprises a further reducing agent, such ascorbic acid, sodium formaldehyde sulfoxylate, sodium disulfite or sodium dithionite. Since the polymerization of the monomers is effected in the presence of starch and since starch likewise acts as reducing agent, the concomitant use of further reducing agents is generally dispensed with. The redox initiators are used, for example, in an amount of from 0.05 to 10% by weight, preferably from 0.1 to 5% by weight, based on the monomers.

Accordingly, polymer dispersions which are obtainable by free radical emulsion polymerization of ethylenically unsaturated monomers in the presence of at least one redox initiator and starch are preferred, (a) from 30 to 60% by weight of at least one optionally substituted styrene,
(b) from 1 to 29% by weight of at least one $C_1$-$C_{12}$-alkyl acrylate and/or $C_1$-$C_{12}$-alkyl methacrylate,
(c) from 0.1 to 5% by weight of at least one other ethylenically unsaturated copolymerizable monomer,
being used as the ethylenically unsaturated monomers and
(d) from 25 to 35% by weight of at least one degraded starch which has a molar mass $M_w$ of from 1000 to 65 000 g/mol being used as the starch,
the sum (a)+(b)+(c)+(d) being 100% and being based on the total solids content, and the polymerization being carried out in the presence of at least 0.01% by weight, based on the monomers used, of at least one terpene-containing chain-transfer agent.

Particularly preferred polymer dispersions are those in which
(a) from 40 to 50% by weight of at least one optionally substituted styrene,
(b) from 5 to 25% by weight of a $C_1$-$C_{12}$-alkyl acrylate and/or $C_1$-$C_{12}$-alkyl methacrylate,
(c) from 0.1 to 5% by weight of at least one other ethylenically unsaturated copolymerizable monomer,
are used as the ethylenically unsaturated monomers and
(d) from 25 to 35% by weight of at least one degraded starch which has a molar mass M, of from 2500 to 35 000 g/mol are used as the starch,
the sum (a)+(b)+(c)+(d) being 100% and being based on the total solids content, and the polymerization being carried out in the presence of at least 0.01% by weight, based on the monomers used, of at least one terpene-containing chain-transfer agent.

Very particularly preferred finely divided, starch-containing polymer dispersions are those in which
(a) from 40 to 50% by weight of at least one optionally substituted styrene,
(b) from 5 to 25% by weight of a $C_1$-$C_{12}$-alkyl acrylate,
(c) from 0.1 to 5% by weight of at least one other ethylenically unsaturated copolymerizable monomer,
are used as the ethylenically unsaturated monomers and
(d) from 25 to 35% by weight of a degraded anionic starch which has a molar mass $M_w$ of from 2500 to 35 000 g/mol are used as the starch,
the sum (a)+(b)+(c)+(d) being 100% and being based on the total solids content, and the polymerization being carried out in the presence of at least 0.01% by weight, based on the monomers used, of at least one monocyclic monoterpene as the chain-transfer agent.

In particular, those finely divided, starch-containing polymer dispersions are preferred in which
(a) from 40 to 50% by weight of at least one optionally substituted styrene,
(b) from 5 to 25% by weight of a $C_1$-$C_4$-alkyl acrylate,
(c) from 0.1 to 5% by weight of at least one other ethylenically unsaturated copolymerizable monomer,
are used as the ethylenically unsaturated monomers and
(d) from 25 to 35% by weight of a degraded anionic starch which has a molar mass $M_w$ of from 2500 to 35 000 g/mol are used as the starch,
the sum (a)+(b)+(c)+(d) being 100% and being based on the total solids content, and the polymerization being carried out in the presence of at least 0.01% by weight, based on the monomers used, of terpinolene as the chain-transfer agent.

The invention also relates to a process for the preparation of the finely divided, starch-containing polymer dispersions according to the invention which are obtainable by emulsion polymerization.

Such a process is distinguished in that
(a) from 30 to 60% by weight of at least one optionally substituted styrene,
(b) from 1 to 60% by weight of a $C_1$-$C_{12}$-alkyl acrylate and/or $C_1$-$C_{12}$-alkyl methacrylate,
(c) from 0 to 10% by weight of at least one other ethylenically unsaturated copolymerizable monomer, and
(d) from 15 to 40% by weight of at least one degraded starch which has a molar mass $M_w$ of from 1000 to 65 000 g/mol, the sum (a)+(b)+(c)+(d) being 100% and being based on the total solids content, are polymerized in the presence of a redox initiator in an aqueous medium and the polymerization is carried out in the presence of at least 0.01% by weight, based on the monomers used, of at least one terpene-containing chain-transfer agent.

The emulsion polymerization of the monomers (a) to (c) is effected in an aqueous medium in the presence of a starch (d) having a molar mass $M_w$ of from 1000 to 65 000 g/mol. The monomers can be polymerized by the emulsion polymerization method, either in the feed procedure or in the batch procedure. Preferably, an aqueous solution of the degraded starch and of a heavy metal salt is initially taken and the monomers are added either separately or as a mixture and, separately therefrom, the oxidizing part of the redox initiator, preferably hydrogen peroxide, is added continuously or batchwise. A gradient procedure, which is disclosed in WO 2002/14393 A1, can also be used for the preparation of the starch-containing polymer dispersions.

The addition can be effected uniformly or nonuniformly, i.e. with changing metering rate, over the metering period.

The polymerization is usually carried out in the absence of oxygen, preferably in an inert gas atmosphere, e.g. under nitrogen. During the polymerization, thorough mixing of the components should be ensured. Thus, the reaction mixture is preferably stirred during the entire duration of the polymerization and of any subsequent postpolymerization.

The polymerization is usually carried out at temperatures of from 30 to 110° C., preferably from 50 to 100° C. Use of a pressure-resistant reactor or carrying out a continuous polymerization in a stirred tank cascade or flow tube is also possible.

For enhancing the dispersing effect, customary ionic, nonionic or amphoteric emulsifiers may be added to the polymerization batch. Customary emulsifiers are only optionally used. The amounts used are from 0 to 3% by weight and are preferably in the range from 0.02 to 2% by weight, based on the sum of the monomers (a), (b) and (c) used. Customary emulsifiers are described in detail in the literature, cf. for example M. Ash, I. Ash, Handbook of Industrial Surfactants, third edition, Synapse Information Resources Inc. Examples of customary emulsifiers are the reaction products of long-chain monohydric alcohols ($C_{10}$- to $C_{22}$-alkanols) with 4 to 50 mol of ethylene oxide and/or propylene oxide per mole of alcohol or ethoxylated phenols, or alkoxylated alcohols esterified with sulfuric acid which are generally used in a form neutralized with alkali. Further customary emulsifiers are, for example, sodium alkanesulfonates, sodium alkylsulfates, sodium dodecylbenzenesulfonate, sulfosuccinic esters, quaternary alkylammonium salts, alkylbenzylammonium salts, such as dimethyl-$C_{12}$- to $C_{18}$-alkylbenzylammonium chlorides, primary, secondary and tertiary fatty amine salts, quaternary amidoamine compounds, alkylpyridinium salts, alkylimidazolinium salts and alkyloxazolinium salts.

During the emulsion polymerization, either the monomers can be metered directly into the initially taken mixture or they can be added in the form of an aqueous emulsion or mini emulsion to the polymerization batch. For this purpose, the monomers are emulsified in water with the use of the above-mentioned customary emulsifiers.

The polymerization is carried out at a pH of from 2 to 9, preferably in the weakly acidic range at a pH from 3 to 5.5. The pH can be adjusted to the desired value before or during the polymerization with customary acids, such as hydrochloric acid, sulfuric acid or acetic acid, or with bases, such as sodium hydroxide solution, potassium hydroxide solution, ammonia, ammonium carbonate, etc. The dispersion is preferably adjusted to a pH of from 3 to 5.5 after the end of the polymerization.

In order to remove the residual monomers as substantially as possible from the starch-containing polymer dispersion, a postpolymerization is expediently carried out. For this purpose, an initiator from the group consisting of hydrogen peroxide, peroxides, hydroperoxides and/or azo initiators is added to the polymer dispersion after the end of the main polymerization. The combination of initiators with suitable reducing agents, such as, for example, ascorbic acid or sodium bisulfite, is likewise possible. Oil-soluble initiators which are sparingly soluble in water are preferably used, for example customary organic peroxides, such as dibenzoyl peroxide, di-tert-butyl peroxide, tert-butyl hydroperoxide, cumyl hydroperoxide or biscyclohexyl peroxodicarbonate.

For the postpolymerization, the reaction mixture is heated, for example, to a temperature which corresponds to the temperature at which the main polymerization was carried out or which is up to 20° C., preferably up to 10° C., higher. The main polymerization is complete when the polymerization initiator has been consumed or the monomer conversion is, for example, at least 98%, preferably at least 99.5%. Tert-butyl hydroperoxide is preferably used for the postpolymerization. The postpolymerization is carried out, for example, in a temperature range from 35 to 100° C., in general from 45 to 95° C.

After the end of the polymerization, a complexing agent for heavy metal ions can be added to the polymer dispersion in an amount such that all heavy metal ions are bound as a complex.

The starch-containing polymer dispersions comprise dispersed particles having a mean particle size of from 20 to 500 nm, preferably from 50 to 250 nm. The mean particle size can be determined by means of methods known to the person skilled in the art, such as, for example, laser correlation spectroscopy, ultracentrifuging or HDF (hydrodynamic fractionation). A further measure of the particle size of the dispersed polymer particles is the LT value. For determining the LT value (light transmittance), the polymer dispersion to be investigated in each case is measured in 0.1% strength by weight aqueous dilution in a cell having an edge length of 2.5 cm using light of 600 nm wavelength and is compared with the corresponding transmittance of water under the same measuring conditions. The transmittance of water is specified as 100%. The more finely divided the dispersion, the higher is the LT value which is measured by the method described above. From the measured values, it is possible to calculate the mean particle size, cf. B. Verner, M. Bárta, B. Sedlácek, Tables of Scattering Functions for Spherical Particles, Prague, 1976, Edice Marco, Rada D-DATA, SVAZEK D-1.

The solids content of the starch-containing polymer dispersion is, for example, from 5 to 50% by weight and is preferably in the range from 15 to 40% by weight.

The finely divided, starch-containing polymer dispersions described above are used as sizes for paper, board and cardboard. They can be used both as surface sizers and as engine sizers in the amounts customary in each case. The use as surface size is preferred. Here, the dispersions according to the invention can be processed by all methods suitable in the case of surface sizing. The polymer dispersions can be applied to the surface of the paper to be sized, for example, by means of a size press, film press or a gate-roll applicator. For use, the dispersion is usually added to the size press liquor in an amount of from 0.05 to 3% by weight, based on solid substance, and depends on the desired degree of sizing of the papers to be finished. Furthermore, the size press liquor may comprise further substances, such as, for example, starch, pigments, dyes, optical brighteners, biocides, paper strength agents, fixing agents, antifoams, retention aids and/or drainage aids. The amounts of polymer which are applied to the surface of paper products are, for example, from 0.005 to 1.0 g/m$^2$, preferably from 0.01 to 0.5 g/m$^2$. Compared with the known sizes, the sizes according to the invention have the advantage that they give a better sizing effect even when applied in small amounts, especially on uncoated wood-free papers.

The invention is explained in more detail with reference to the following, non-limiting examples.

EXAMPLES

The percentage data in the examples are percent by weight, unless evident otherwise from the context.

LT values were determined in 0.1% strength aqueous solution of the dispersion to be determined, using a DR/2010 apparatus from Hach at a wavelength of 600 nm. The particle sizes were determined by means of a high performance particle sizer (HPPS) from Malvern using an He—Ne laser (633 nm) at a scattering angle of 173°.

Example 1

65.0 g of an oxidatively degraded starch having a COO$^-$ degree of substitution of 0.03-0.04 and a K value of 34 (determined according to DIN 53726) (Amylex® 15 from Südstärke), 0.80 g of calcium acetate hydrate and 380 g of water were initially taken in a polymerization vessel which was equipped with a stirrer, reflux condenser, metering apparatuses and setup for working under a nitrogen atmosphere and were heated to 85° C. with stirring. Thereafter, 1.60 g of 1.0% strength by weight enzyme solution (α-amylase, Termamyl® 120 L from Novo Nordisk) were added and the batch was then stirred for 20 min. The enzymatic starch degradation was stopped by the addition of 4.0 g of glacial acetic acid.

This was followed by the addition of 2.0 g of a 10.0% strength by weight of iron(II) sulfate solution and thereafter the feed of 4.0 g of a 2.5% strength by weight of hydrogen peroxide solution for 10 min. A further 40.0 g of a 2.5% strength by weight hydrogen peroxide solution were then fed in the course of 120 min. At the same time, 118.0 g of styrene, 30.0 g of tert-butyl acrylate and 1.1 g of terpinolene were added at 85° C. in the course of 90 min and, simultaneously therewith, 110.0 g of water were added. Thereafter, 40.0 g of deionized water were added. After the monomer feed was complete, postpolymerization was effected for a further 30 min at 85° C. before the batch was cooled to 65° C. At this temperature, 4.0 g of tert-butyl hydroperoxide were added and stirred for 40 min. Cooling to room temperature was then effected.

A dispersion having a solids content of 25.4% by weight, and an LT value of 57% and a particle diameter of 94 nm was obtained.

Comparative Example 1

65.0 g of an oxidatively degraded starch having a COO$^-$ degree of substitution of 0.03-0.04 and a K value of 34 (determined according to DIN 53726) (Amylex® 15 from Südstärke), 0.80 g of calcium acetate hydrate and 380 g of water were initially taken in a polymerization vessel which was equipped with a stirrer, reflux condenser, metering apparatuses and setup for working under a nitrogen atmosphere and were heated to 85° C. with stirring. Thereafter, 1.60 g of 1.0% strength by weight enzyme solution (α-amylase, Termamyl® 120 L from Novo Nordisk) were added and the batch was then stirred for 20 min. The enzymatic starch degradation was stopped by the addition of 4.0 g of glacial acetic acid.

This was followed by the addition of 2.0 g of a 10.0% strength by weight of iron(II) sulfate solution and thereafter the feed of 4.0 g of a 2.5% strength by weight of hydrogen peroxide solution for 10 min. A further 40.0 g of a 2.5% strength by weight hydrogen peroxide solution were then fed in the course of 120 min. At the same time, 118.4 g of styrene and 29.6 g of tert-butyl acrylate were added at 85° C. in the course of 90 min and, simultaneously therewith, 110.0 g of water were added. Thereafter, 40.0 g of deionized water were added. After the monomer feed was complete, postpolymerization was effected for a further 30 min at 85° C. before the batch was cooled to 65° C. At this temperature, 4.0 g of tert-butyl hydroperoxide were added and stirred for 40 min. Cooling to room temperature was then effected.

A dispersion having a solids content of 25.03% by weight, and an LT value of 43% and a particle diameter of 99 nm was obtained.

Example 2

75.0 g of an oxidatively degraded starch having a COO$^-$ degree of substitution of 0.03-0.04 and a K value of 34 (determined according to DIN 53726) (Amylex® 15 from Südstärke) and 370 g of water were initially taken in a polymerization vessel which was equipped with a stirrer, reflux condenser, metering apparatuses and setup for working under a nitrogen atmosphere and were heated to 80° C. with stirring. Thereafter, 0.80 g of a 1.0% strength by weight enzyme solution (α-amylase, Multifect® AA1200L from Genencor) was added and the batch was stirred for 30 min. This was followed by the addition of 4.0 g of 10.0% strength by weight of iron(II) sulfate solution, with the result that the enzymatic degradation was stopped.

The reaction temperature was then increased to 85° C. in the course of 5 min. The feed of 75.0 g of a 5.0% strength by weight hydrogen peroxide solution within 180 min began at the same time. Likewise simultaneously, the monomer feed consisting of 110.0 g of styrene, 29.0 g of tert-butyl acrylate, 1.5 g of acrylic acid and 0.9 g of terpinolene and 110.0 g of deionized water and 0.5 g of a 40% strength by weight of emulsifier solution (sodium $C_{14}$-$C_{15}$-alkanesulfonates, Emulgator® K30 from Bayer AG) was effected within 120 min. After the monomer feed was complete, postpolymerization was effected for a further 30 min at 85° C. This was followed by the addition of 15.0 g of deionized water and of 2.0 g of tert-butyl hydroperoxide. The batch was then stirred for a further 40 min. Cooling to room temperature was then effected.

A dispersion having a solids content of 25.11% by weight, and an LT value of 70% and a particle diameter of 77 nm was obtained.

Comparative Example 2

75.0 g of an oxidatively degraded starch having a COO$^-$ degree of substitution of 0.03-0.04 and a K value of 34 (determined according to DIN 53726) (Amylex® 15 from Süd- stärke) and 370 g of water were initially taken in a polymerization vessel which was equipped with a stirrer, reflux condenser, metering apparatuses and setup for working under a nitrogen atmosphere and were heated to 80° C. with stirring. Thereafter, 0.80 g of a 1.0% strength by weight enzyme solution (α-amylase, Multifect® AA1200L from Genencor) was added and the batch was stirred for 30 min. This was followed by the addition of 4.0 g of 10.0% strength by weight of iron(II) sulfate solution, with the result that the enzymatic degradation was stopped.

The reaction temperature was then increased to 85° C. in the course of 5 min. The feed of 75.0 g of a 5.0% strength by weight hydrogen peroxide solution within 180 min began at the same time. Likewise simultaneously, the monomer feed consisting of 110.0 g of styrene, 28.5 g of tert-butyl acrylate, 1.5 g of acrylic acid and 110.0 g of deionized water and 0.5 g of a 40% strength by weight of emulsifier solution (sodium $C_{14}$-$C_{15}$-alkanesulfonates, Emulgator® K30 from Bayer AG) was effected within 120 min. After the monomer feed was complete, postpolymerization was effected for a further 30 min at 85° C. This was followed by the addition of 15.0 g of deionized water and of 2.0 g of tert-butyl hydroperoxide. The batch was then stirred for a further 40 min. Cooling to room temperature was then effected.

A dispersion having a solids content of 24.99% by weight, and an LT value of 56% and a particle diameter of 88 nm was obtained.

Example 3

75.0 g of an oxidatively degraded starch having a $COO^-$ degree of substitution of 0.03-0.04 and a K value of 34 (determined according to DIN 53726) (Amylex® 15 from Südstärke) and 370 g of water were initially taken in a polymerization vessel which was equipped with a stirrer, reflux condenser, metering apparatuses and setup for working under a nitrogen atmosphere and were heated to 80° C. with stirring. Thereafter, 0.80 g of a 1.0% strength by weight enzyme solution (α-amylase, Multifect® AA1200L from Genencor) was added and the batch was stirred for 30 min. This was followed by the addition of 4.0 g of 10.0% strength by weight of iron(II) sulfate solution, with the result that the enzymatic degradation was stopped.

The reaction temperature was then increased to 85° C. in the course of 5 min. The feed of 75.0 g of a 5.0% strength by weight hydrogen peroxide solution within 180 min began at the same time. Likewise simultaneously, the monomer feed consisting of 96.0 g of styrene, 43.0 g of tert-butyl acrylate, 1.5 g of acrylic acid and 1.1 g of terpinolene and 110.0 g of deionized water and 0.5 g of a 40% strength by weight of emulsifier solution (sodium $C_{14}$-$C_{15}$-alkanesulfonates, Emulgator® K30 from Bayer AG) was effected within 120 min. After the monomer feed was complete, postpolymerization was effected for a further 30 min at 85° C. This was followed by the addition of 15.0 g of deionized water and of 2.0 g of tert-butyl hydroperoxide. The batch was then stirred for a further 40 min. Cooling to room temperature was then effected.

A dispersion having a solids content of 25.11% by weight, and an LT value of 75% and a particle diameter of 73 nm was obtained.

Comparative Example 3

75.0 g of an oxidatively degraded starch having a $COO^-$ degree of substitution of 0.03-0.04 and a K value of 34 (determined according to DIN 53726) (Amylex® 15 from Süd- stärke) and 370 g of water were initially taken in a polymerization vessel which was equipped with a stirrer, reflux condenser, metering apparatuses and setup for working under a nitrogen atmosphere and were heated to 80° C. with stirring. Thereafter, 0.80 g of a 1.0% strength by weight enzyme solution (α-amylase, Multifect® AA1200L from Genencor) was added and the batch was stirred for 30 min. This was followed by the addition of 4.0 g of 10.0% strength by weight of iron(II) sulfate solution, with the result that the enzymatic degradation was stopped.

The reaction temperature was then increased to 85° C. in the course of 5 min. The feed of 75.0 g of a 5.0% strength by weight hydrogen peroxide solution within 180 min began at the same time. Likewise simultaneously, the monomer feed consisting of 96.0 g of styrene, 42.5 g of tert-butyl acrylate, 1.5 g of acrylic acid and 110.0 g of deionized water and 0.5 g of a 40% strength by weight of emulsifier solution (sodium $C_{14}$-$C_{15}$-alkanesulfonates, Emulgator® K30 from Bayer AG) was effected within 120 min. After the monomer feed was complete, postpolymerization was effected for a further 30 min at 85° C. This was followed by the addition of 15.0 g of deionized water and of 2.0 g of tert-butyl hydroperoxide. The batch was then stirred for a further 40 min. Cooling to room temperature was then effected.

A dispersion having a solids content of 24.51% by weight, and an LT value of 70% and a particle diameter of 76 nm was obtained.

Example 4

75.0 g of an oxidatively degraded starch having a $COO^-$ degree of substitution of 0.03-0.04 and a K value of 34 (determined according to DIN 53726) (Amylex® 15 from Südstärke) and 370 g of water were initially taken in a polymerization vessel which was equipped with a stirrer, reflux condenser, metering apparatuses and setup for working under a nitrogen atmosphere and were heated to 80° C. with stirring. Thereafter, 0.80 g of a 1.0% strength by weight enzyme solution (α-amylase, Multifect® AA1200L from Genencor) was added and the batch was stirred for 30 min. This was followed by the addition of 4.0 g of 10.0% strength by weight of iron(II) sulfate solution, with the result that the enzymatic degradation was stopped.

The reaction temperature was then increased to 85° C. in the course of 5 min. The feed of 50.0 g of a 5.0% strength by weight hydrogen peroxide solution within 150 min began at the same time. Likewise simultaneously, the monomer feed consisting of 93.0 g of styrene, 46.0 g of n-butyl acrylate, 1.5 g of acrylic acid and 1.0 g of terpinolene and 110.0 g of deionized water and 0.5 g of a 40% strength by weight of emulsifier solution (sodium $C_{14}$-$C_{15}$-alkanesulfonates, Emulgator® K30 from Bayer AG) was effected within 120 min. After the monomer feed was complete, postpolymerization was effected for a further 30 min at 85° C. This was followed by the addition of 15.0 g of deionized water and of 2.0 g of tert-butyl hydroperoxide. The batch was then stirred for a further 40 min. Cooling to room temperature was then effected.

A dispersion having a solids content of 25.39% by weight, and an LT value of 74% and a particle diameter of 82 nm was obtained.

Comparative Example 4

75.0 g of an oxidatively degraded starch having a $COO^-$ degree of substitution of 0.03-0.04 and a K value of 34 (determined according to DIN 53726) (Amylex® 15 from Süd- stärke) and 370 g of water were initially taken in a polymerization vessel which was equipped with a stirrer, reflux condenser, metering apparatuses and setup for working under a nitrogen atmosphere and were heated to 80° C. with stirring. Thereafter, 0.80 g of a 1.0% strength by weight enzyme solution (α-amylase, Multifect® AA1200L from Genencor) was added and the batch was stirred for 30 min. This was followed by the addition of 4.0 g of 10.0% strength by weight of iron(II) sulfate solution, with the result that the enzymatic degradation was stopped.

The reaction temperature was then increased to 85° C. in the course of 5 min. The feed of 50.0 g of a 5.0% strength by weight hydrogen peroxide solution within 150 min began at the same time. Likewise simultaneously, the monomer feed consisting of 92.5 g of styrene, 46.0 g of n-butyl acrylate and 1.5 g of acrylic acid and 110.0 g of deionized water and 0.5 g of a 40% strength by weight of emulsifier solution (sodium $C_{14}$-$C_{15}$-alkanesulfonates, Emulgator® K30 from Bayer AG) was effected within 120 min. After the monomer feed was complete, postpolymerization was effected for a further 30 min at 85° C. This was followed by the addition of 15.0 g of deionized water and of 2.0 g of tert-butyl hydroperoxide. The batch was then stirred for a further 40 min. Cooling to room temperature was then effected.

A dispersion having a solids content of 25.88% by weight, and an LT value of 75% and a particle diameter of 91 nm was obtained.

Example 5

83.0 g of a starch (potato starch hydroxyethyl ether, Solfarex® A55 from Avebe) and 480 g of water were initially taken in a polymerization vessel which was equipped with a stirrer, reflux condenser, metering apparatuses and setup for working under a nitrogen atmosphere and were heated to 80° C. with stirring. Thereafter, 1.9 g of a 1.0% strength by weight enzyme solution (α-amylase, Multifect® AA1200L from Genencor) were added and the batch was stirred for 30 min. This was followed by the addition of 4.0 g of 10.0% strength by weight of iron(II) sulfate solution, with the result that the enzymatic degradation was stopped.

The reaction temperature was then increased to 85° C. within 5 min. The feed of 75.0 g of a 5.0% strength by weight of hydrogen peroxide solution within 180 min began at the same time. Likewise at the same time, the monomer feed consisting of 86.0 g of styrene, 44.0 g of n-butyl acrylate, 0.4 g of acrylic acid and 0.7 g of terpinolene was effected within 120 min. After the monomer feed was complete, postpolymerization was effected for a further 60 min at 80° C. This was followed by the addition of 15.0 g of deionized water. Cooling to room temperature was then effected.

A dispersion having a solids content of 25.9% by weight, an LT value of 79% and a particle diameter of 72 nm was obtained.

Comparative Example 5

83.0 g of a starch (potato starch hydroxyethyl ether, Solfarex® A55 from Avebe) and 480 g of water were initially taken in a polymerization vessel which was equipped with a stirrer, reflux condenser, metering apparatuses and setup for working under a nitrogen atmosphere and were heated to 80° C. with stirring. Thereafter, 1.9 g of a 1.0% strength by weight enzyme solution (α-amylase, Multifect® AA1200L from Genencor) were added and the batch was stirred for 30 min. This was followed by the addition of 4.0 g of 10.0% strength by weight of iron(II) sulfate solution, with the result that the enzymatic degradation was stopped.

The reaction temperature was then increased to 85° C. within 5 min. The feed of 75.0 g of a 5.0% strength by weight of hydrogen peroxide solution within 180 min began at the same time. Likewise at the same time, the monomer feed consisting of 86.0 g of styrene, 44.0 g of n-butyl acrylate and 0.4 g of acrylic acid was effected within 120 min. After the monomer feed was complete, postpolymerization was effected for a further 60 min at 80° C. This was followed by the addition of 15.0 g of deionized water. Cooling to room temperature was then effected.

A dispersion having a solids content of 25.39% by weight, an LT value of 76% and a particle diameter of 70 nm was obtained.

Example 6

68.0 g of a native pea starch and 480 g of water were initially taken in a polymerization vessel which was equipped with a stirrer, reflux condenser, metering apparatuses and setup for working under a nitrogen atmosphere and were heated to 80° C. with stirring. Thereafter, 6.0 g of a 1.0% strength by weight enzyme solution (α-amylase, Multifect® AA1200L from Genencor) were added and the batch was stirred for 30 min.

This was followed by the addition of 4.0 g of 10.0% strength by weight of iron(II) sulfate solution, with the result that the enzymatic degradation was stopped.

The reaction temperature was then increased to 85° C. within 5 min. The feed of 75.0 g of a 5.0% strength by weight of hydrogen peroxide solution within 180 min began at the same time. Likewise at the same time, the monomer feed consisting of 93.0 g of styrene, 46.0 g of n-butyl acrylate, 1.5 g of acrylic acid and 1.1 g of terpinolene was effected within 120 min. After the monomer feed was complete, postpolymerization was effected for a further 60 min at 80° C. This was followed by the addition of 15.0 g of deionized water. Cooling to room temperature was then effected.

A dispersion having a solids content of 25.79% by weight, an LT value of 12% and a particle diameter of 158 nm was obtained.

Comparative Example 6

68.0 g of a native pea starch and 480 g of water were initially taken in a polymerization vessel which was equipped with a stirrer, reflux condenser, metering apparatuses and setup for working under a nitrogen atmosphere and were heated to 80° C. with stirring. Thereafter, 6.0 g of a 1.0% strength by weight enzyme solution (α-amylase, Multifect® AA1200L from Genencor) were added and the batch was stirred for 30 min. This was followed by the addition of 4.0 g of 10.0% strength by weight of iron(II) sulfate solution, with the result that the enzymatic degradation was stopped.

The reaction temperature was then increased to 85° C. within 5 min. The feed of 75.0 g of a 5.0% strength by weight of hydrogen peroxide solution within 180 min began at the same time. Likewise at the same time, the monomer feed consisting of 93.0 g of styrene, 46.0 g of n-butyl acrylate and 1.5 g of acrylic acid was effected within 120 min. After the monomer feed was complete, postpolymerization was effected for a further 60 min at 80° C. This was followed by the addition of 15.0 g of deionized water. Cooling to room temperature was then effected.

A dispersion having a solids content of 25.59% by weight, an LT value of 9% and a particle diameter of 167 nm was obtained.

Example 7

91.0 g of an anionic tapioca starch (AF 382 S from Eimhaeng Modified Starch) and 400 g of water were initially taken in a polymerization vessel which was equipped with a stirrer, reflux condenser, metering apparatuses and setup for working under a nitrogen atmosphere and were heated to 80° C. with stirring. Thereafter, 4.0 g of a 1.0% strength by weight enzyme solution (α-amylase, Termamyl® 120 L from Novo Nordisk) were added and the batch was stirred for 20 min. This was followed by the addition of 4.0 g of a 10.0% strength by weight of iron(II) sulfate solution, with the result that the enzymatic degradation was stopped.

The reaction temperature was then increased to 85° C. within 5 min. The feed of 91.0 g of a 5.0% strength by weight hydrogen peroxide solution within 165 min began at the same time. After 10 min, the monomer feed consisting of 85.0 g of styrene, 33.0 g of n-butyl acrylate, 1.5 g of acrylic acid and 1.1 g of terpinolene and 0.5 g of a 40% strength by weight emulsifier solution (sodium $C_{14}$-$C_{15}$-alkylsulfonates, Emulgator® K30 from Bayer AG) and 80.0 g of water was effected within 120 min. After the monomer feed was complete, postpolymerization was effected for a further 35 min at 80° C. This was followed by the addition of 15.0 g of deionized water and of 2.0 g of tert.-butyl hydroperoxide. The batch was stirred for 30 min. Cooling to room temperature was then effected.

A dispersion having a solids content of 24.88% by weight, an LT value of 56% and a particle diameter of 115 nm was obtained.

Comparative Example 7

91.0 g of an anionic tapioca starch (AF 382 S from Eimhaeng Modified Starch) and 400 g of water were initially taken in a polymerization vessel which was equipped with a stirrer, reflux condenser, metering apparatuses and setup for working under a nitrogen atmosphere and were heated to 80° C. with stirring. Thereafter, 4.0 g of a 1.0% strength by weight enzyme solution (α-amylase, Termamyl® 120 L from Novo Nordisk) were added and the batch was stirred for 20 min. This was followed by the addition of 4.0 g of a 10.0% strength by weight of iron(II) sulfate solution, with the result that the enzymatic degradation was stopped.

The reaction temperature was then increased to 85° C. within 5 min. The feed of 91.0 g of a 5.0% strength by weight hydrogen peroxide solution within 165 min began at the same time. After 10 min, the monomer feed consisting of 85.0 g of styrene, 33.0 g of n-butyl acrylate and 1.5 g of acrylic acid and 0.5 g of a 40% strength by weight emulsifier solution (sodium $C_{14}$-$C_{15}$-alkylsulfonates, Emulgator® K30 from Bayer AG) and 80.0 g of water was effected within 120 min. After the monomer feed was complete, postpolymerization was effected for a further 35 min at 80° C. This was followed by the addition of 15.0 g of deionized water and of 2.0 g of tert.-butyl hydroperoxide. The batch was stirred for 30 min. Cooling to room temperature was then effected.

A dispersion having a solids content of 25.21% by weight, an LT value of 31% and a particle diameter of 125 nm was obtained.

Example 8

83.0 g of a starch (potato starch hydroxyethyl ether, Sofarex® A55 from Avebe) and 480 g of water were initially taken in a polymerization vessel which was equipped with a stirrer, reflux condenser, metering apparatuses and setup for working under a nitrogen atmosphere and were heated to 80° C. with stirring. Thereafter, 1.9 g of a 1.0% strength by weight enzyme solution (α-amylase, Multifect® AA 1200L from Genencor) were added and the batch was stirred for 30 min. This was followed by the addition of 4.0 g of a 10.0% strength by weight of iron(II) sulfate solution, with the result that the enzymatic degradation was stopped.

The reaction temperature was then increased to 85° C. within 5 min. The feed of 75.0 g of a 5.0% strength by weight hydrogen peroxide solution within 180 min began at the same time. Likewise at the same time, the monomer feed consisting of 82.0 of styrene, 44.0 g of n-butyl acrylate, 4.0 g of acrylic acid and 0.7 g of terpinolene was effected within 120 min. After the monomer feed was complete, postpolymerization was effected for a further 60 min at 80° C. This was followed by the addition of 15.0 g of deionized water. Cooling to room temperature was then effected.

A dispersion having a solids content of 25.7% by weight, an LT value of 74% and a particle diameter of 81 nm was obtained.

Comparative Example 8

83.0 g of a starch (potato starch hydroxyethyl ether, Sofarex® A55 from Avebe) and 480 g of water were initially taken in a polymerization vessel which was equipped with a stirrer, reflux condenser, metering apparatuses and setup for working under a nitrogen atmosphere and were heated to 80° C. with stirring. Thereafter, 1.9 g of a 1.0% strength by weight enzyme solution (α-amylase, Multifect® AA 1200L from Genencor) were added and the batch was stirred for 30 min. This was followed by the addition of 4.0 g of a 10.0% strength by weight of iron(II) sulfate solution, with the result that the enzymatic degradation was stopped.

The reaction temperature was then increased to 85° C. within 5 min. The feed of 75.0 g of a 5.0% strength by weight hydrogen peroxide solution within 180 min began at the same time. Likewise at the same time, the monomer feed consisting of 82.0 of styrene, 44.0 g of n-butyl acrylate and 4.0 g of acrylic acid was effected within 120 min. After the monomer feed was complete, postpolymerization was effected for a further 60 min at 80° C. This was followed by the addition of 15.0 g of deionized water. Cooling to room temperature was then effected.

A dispersion having a solids content of 25.9% by weight, an LT value of 77% and a particle diameter of 76 nm was obtained.

Example 9

59.0 g of an oxidatively degraded tapioca starch (from Siam Modified Starch Co., Ltd.) and 278 g of water were initially taken in a polymerization vessel which was equipped with a stirrer, reflux condenser, metering apparatuses and setup for working under a nitrogen atmosphere and were heated to 80° C. with stirring. Thereafter, 1.90 g of a 1.0% strength by weight enzyme solution (α-amylase, Termamyl® 120 L from Novo Nordisk) were added and the batch was stirred for 20 min. This was followed by the addition of 3.0 g of a 10.0% strength by weight iron(II) sulfate solution, with the result that the enzymatic degradation was stopped.

The reaction temperature was then increased to 85° C. within 5 min. Feed of 51.0 g of a 5.0% strength by weight hydrogen peroxide solution within 165 min began at the same time. After 10 min, the monomer feed consisting of 70.5 g of styrene, 15 g of t-butyl acrylate, 15 g of n-butyl acrylate, 0.8 g of terpinolene, 0.4 g of a 40% strength by weight emulsifier solution (sodium $C_{14}$-$C_{15}$-alkylsulfonates, Emulgator® K30 from Bayer AG) and 82.5 g of water was effected within 120 min. This was followed by the addition of 11.3 g of fully deionized water. After the monomer feed was complete, postpolymerization was effected for a further 30 min at 85° C. This was followed by the addition of 1.5 g of a 10% strength by weight tert-butyl hydroperoxide solution, and the batch was stirred for 30 min. Cooling to room temperature was then effected.

A dispersion having a solids content of 25.4% by weight, an LT value of 51% and a particle diameter of 120 nm was obtained.

Comparative Example 9

59.0 g of an oxidatively degraded tapioca starch (from Siam Modified Starch Co., Ltd.) and 278 g of water were initially taken in a polymerization vessel which was equipped with a stirrer, reflux condenser, metering apparatuses and setup for working under a nitrogen atmosphere and were heated to 80° C. with stirring. Thereafter, 1.90 g of a 1.0% strength by weight enzyme solution (α-amylase, Termamyl® 120 L from Novo Nordisk) were added and the batch was stirred for 20 min. This was followed by the addition of 3.0 g of a 10.0% strength by weight iron(II) sulfate solution, with the result that the enzymatic degradation was stopped.

The reaction temperature was then increased to 85° C. within 5 min. Feed of 51.0 g of a 5.0% strength by weight hydrogen peroxide solution within 165 min began at the same time. After 10 min, the monomer feed consisting of 70.5 g of styrene, 15 g of t-butyl acrylate, 15 g of n-butyl acrylate, and 0.4 g of a 40% strength by weight emulsifier solution (sodium $C_{14}$-$C_{15}$-alkylsulfonates, Emulgator® K30 from Bayer AG) and 82.5 g of water was effected within 120 min. This was followed by the addition of 11.3 g of fully deionized water. After the monomer feed was complete, postpolymerization was effected for a further 30 min at 85° C. This was followed by the addition of 1.5 g of a 10% strength by weight tert-butyl hydroperoxide solution, and the batch was stirred for 30 min. Cooling to room temperature was then effected.

A dispersion having a solids content of 26.4% by weight, an LT value of 56% and a particle diameter of 101 nm was obtained.

Example 10

54.0 g of an oxidatively degraded tapioca starch (from Siam Modified Starch Co., Ltd.) and 278 g of water were initially taken in a polymerization vessel which was equipped with a stirrer, reflux condenser, metering apparatuses and setup for working under a nitrogen atmosphere and were heated to 80° C. with stirring. Thereafter, 2.4 g of a 1.0% strength by weight enzyme solution (α-amylase, Termamyl® 120 L from Novo Nordisk) were added and the batch was stirred for 20 min. This was followed by the addition of 3.0 g of a 10.0% strength by weight iron(II) sulfate solution, with the result that the enzymatic degradation was stopped.

The reaction temperature was then increased to 85° C. within 5 min. Feed of 51.0 g of a 5.0% strength by weight hydrogen peroxide solution within 165 min began at the same time and likewise simultaneously, the monomer feed consisting of 74.0 g of styrene, 7.5 g of t-butyl acrylate, 22.5 g of n-butyl acrylate, 1.1 g of acrylic acid, 0.5 g of terpinolene, 0.4 g of a 40% strength by weight emulsifier solution (sodium $C_{14}$-$C_{15}$-alkylsulfonates, Emulgator® K30 from Bayer AG) and 82.5 g of water was effected within 120 min. This was followed by the addition of 11.3 g of fully deionized water. After the monomer feed was complete, postpolymerization was effected for a further 30 min at 85° C. This was followed by the addition of 1.5 g of a 10% strength by weight tert-butyl hydroperoxide solution, and the batch was stirred for 30 min. Cooling to room temperature was then effected.

A dispersion having a solids content of 25.5% by weight, an LT value of 61% and a particle diameter of 94 nm was obtained.

Comparative Example 10

54.0 g of an oxidatively degraded tapioca starch (from Siam Modified Starch Co., Ltd.) and 278 g of water were initially taken in a polymerization vessel which was equipped with a stirrer, reflux condenser, metering apparatuses and setup for working under a nitrogen atmosphere and were heated to 80° C. with stirring. Thereafter, 2.4 g of a 1.0% strength by weight enzyme solution (α-amylase, Termamyl® 120 L from Novo Nordisk) were added and the batch was stirred for 20 min. This was followed by the addition of 3.0 g of a 10.0% strength by weight iron(II) sulfate solution, with the result that the enzymatic degradation was stopped.

The reaction temperature was then increased to 85° C. within 5 min. Feed of 51.0 g of a 5.0% strength by weight hydrogen peroxide solution within 165 min began at the same time and likewise simultaneously, the monomer feed consisting of 74.0 g of styrene, 7.5 g of t-butyl acrylate, 22.5 g of n-butyl acrylate, 1.1 g of acrylic acid, 0.4 g of a 40% strength by weight emulsifier solution (sodium $C_{14}$-$C_{15}$-alkylsulfonates, Emulgator® K30 from Bayer AG) and 82.5 g of water was effected within 120 min. This was followed by the addition of 11.3 g of fully deionized water. After the monomer feed was complete, postpolymerization was effected for a further 30 min at 85° C. This was followed by the addition of 1.5 g of a 10% strength by weight tert-butyl hydroperoxide solution, and the batch was stirred for 30 min. Cooling to room temperature was then effected.

A dispersion having a solids content of 26.2% by weight, an LT value of 58% and a particle diameter of 90 nm was obtained.

Comparative example A, corresponding to example 5 from WO 07/000,420 A1

79.55 g of an anionic potato starch (DS value=0.044) were initially taken in a 2 l flask having a plane-ground joint and a stirrer and internal temperature measurement. 430 g of demineralized water, 2.30 g of an α-amylase (1% strength) and 1.02 g of 25% strength calcium acetate hydrate were added with stirring. The mixture was heated to 85° C. and stirred at this temperature for 30 min. Thereafter, 9.22 g of glacial acetic acid and 2.60 g of 10% strength iron(II) sulfate heptahydrate were added and 4.9 g of an 18% strength hydrogen peroxide solution were then added.

Thereafter, a monomer feed consisting of 124.7 g of demineralized water, 0.20 g of a mixture of the sodium salt of alkanesulfonates having an average chain length of $C_{15}$ (40% strength), 2.3 g of tert-dodecyl mercaptan, 84.64 g of styrene, 42.32 g of ethylhexyl acrylate and 42.32 g of tert-butyl acrylate was started. The duration of the feed was 90 min. A feed of 39.6 g of 18% strength hydrogen peroxide solution was started at the same time and continued over a period of 120 min. The mixture was subjected to postpolymerization for 30 min and then cooled to 50° C. Thereafter, 2.19 g of 10% strength tert-butyl hydroperoxide were added, stirring was effected for a further 30 min and cooling to 30° C. was then effected. Thereafter, 28.94 g of 25% strength NaOH and 100 ml of water were added, with the result that the dispersion was rendered neutral.

A finely divided polymer dispersion having a solids content of 25.47% by weight and an LT value (0.1%) of 83% was obtained. The mean particle size was 98 nm.

Comparative example B, corresponding to example 1 from WO 02/14393 A1

144 g of an oxidatively degraded starch having a COO⁻ degree of substitution of 0.03-0.04 and a K value of 34 (determined according to DIN 53726) (Amylex® 15 from Südstärke) and 298 g of water were initially taken in a polymerization vessel which was equipped with a stirrer, reflux condenser, metering apparatuses and setup for working under a nitrogen atmosphere and were heated to 85° C. in 25 min with stirring. Thereafter, 1.6 g of a 25% strength by weight aqueous calcium acetate solution and 10 g of a 1% strength by weight commercially available enzyme solution (α-amylase, Termamyl® 120L from Novo Nordisk) were added. After 30 minutes, the enzymatic starch degradation was stopped by adding 16 g of glacial acetic acid. 32 g of a 1% strength by weight aqueous iron(II) sulfate solution were also added.

The temperature of the reaction mixture was kept at 85° C. At this temperature, a mixture of 100 g of water, 5 g of a 4% strength by weight of emulsifier solution (sodium $C_{14}$-$C_{15}$-alkanesulfonates, Emulgator K30 from Bayer AG), 84 g of n-butyl acrylate and 196 g of styrene was added within 90 minutes. The initiator feed was begun simultaneously with the monomer feed. Within the first 30 minutes, 40 g of a 30% strength by weight hydrogen peroxide solution were added. 13 g of a 30% strength by weight hydrogen peroxide solution were then added in 75 minutes. After the total amount of monomers had been metered in, the temperature was kept at polymerization temperature up to the end of the initiator feed. Thereafter, cooling to room temperature was effected and a pH of the dispersion of 5 was established.

A dispersion having a solids content of 42% by weight, an LT value of 93% and a particle diameter of 88 nm was obtained.

Comparative example C, corresponding to comparative example 2 from WO 02/14393 A1

144.5 g of an oxidatively degraded starch having a COO⁻ degree of substitution of 0.03-0.04 and a K value of 34 (determined according to DIN 53726) (Amylex® 15 from Südstärke) and 330 g of water were initially taken in a polymerization vessel which was equipped with a stirrer, reflux condenser, metering apparatuses and setup for working under a nitrogen atmosphere and were heated to 85° C. in 25 min with stirring. Thereafter, 1.6 g of a 25% strength by weight aqueous calcium acetate solution and 20 g of a 1% strength by weight commercially available enzyme solution (α-amylase, Termamyl® 120L from Novo Nordisk) were added. After 30 minutes, the enzymatic starch degradation was stopped by adding 16 g of glacial acetic acid. 32 g of a 1% strength by weight aqueous iron(II) sulfate solution were also added.

The temperature of the reaction mixture was kept at 85° C. At this temperature, a mixture of 100 g of water, 5 g of a 4% strength by weight emulsifier solution (sodium $C_{14}$-$C_{15}$-alkanesulfonates, Emulgator K30 from Bayer AG), 84 g of n-butyl acrylate and 196 g of styrene was added within 90 minutes. The initiator feed began simultaneously with the monomer feed. 13 g of a 30% strength by weight hydrogen peroxide solution were added in 90 minutes. After the end of the monomer addition, the temperature was kept at polymerization temperature up to the end of the initiator feed. Thereafter, cooling to room temperature was effected and a pH of the dispersion of 5 was established.

A dispersion having a solids content of 43.5% by weight, an LT value of 90% and a particle diameter of 119 nm was obtained.

Comparative example D, corresponding to example 9 from WO 99/42490 A1

109.2 g of oxidatively degraded potato starch (Perfectamyl® A 4692 from Avebe) were dispersed in 1062 g of demineralized water under nitrogen in a 2 l flask having a plane-ground joint and a stirrer and jacket heating and the starch was dissolved by heating to 86° C. with stirring. 23.2 g of a 1% strength of iron(II) sulfate solution and 71.4 g of a 3% strength of hydrogen peroxide solution were added in succession, after which stirring was effected for 15 min at 86° C. Thereafter, the following two metered solutions were metered in simultaneously and at constant metering rate within 90 min: 1) monomer mixture comprising 145.6 g of styrene, 102.8 g of n-butyl acrylate and 85.6 g of methyl methacrylate and 2) 97.4 g of a 3% strength hydrogen peroxide solution. After the end of the metering, stirring was effected for a further 15 min at 86° C. and reactivation was then effected by addition of 2 g of tert-butyl hydroperoxide. After stirring for a further 60 min at 86° C., the dispersion was cooled to room temperature, 10 g of a 10% strength solution of ethylenediaminetetraacetate (as tetrasodium salt) were added and a pH of 6.5 was established with 11.4 g of 10% strength sodium hydroxide solution.

Filtration was effected over a polyamide filter having a mesh size of 100 μm, and a finely divided dispersion having a solids content of 25.0% was obtained. The extinction of a 2.5% strength solution prepared therefrom was 0.884 (660 nm, 1 cm cell).

Comparative example E, corresponding to example 1 from WO 99/42490 A1

124.5 g of oxidatively degraded potato starch (Perfectamyl® A 4692 from Avebe) were dispersed in 985 g of deionized water under nitrogen in a 2 l flask having a plane-ground joint and a stirrer, reflux condenser and jacket heating and were dissolved by heating to 86° C. 42.7 g of a 1% strength iron(II) sulfate solution and 166 g of a 3% strength hydrogen peroxide solution were added in succession and stirring was effected for 15 min at 86° C. After 15 min, the following metered solutions were metered in simultaneously but separately at constant metering rate within 90 min at 86° C.: 1) a mixture of 106.6 g of styrene, 80.3 g of n-butyl acrylate and 80.3 g of tert-butyl acrylate and 2) 93.7 g of a 3% strength hydrogen peroxide solution. After the end of the metering, stirring was effected for a further 15 min at 86° C. and 2 g of tert-butyl hydroperoxide were then added for reactivation. After a further 60 min at 86° C., cooling to room temperature was effected, 10 g of a 10% strength solution of ethylenediaminetetraacetic acid as tetrasodium salt were added and a pH of 6.5 was established with 13 g of a 10% strength sodium hydroxide solution.

Filtration was effected over a 100 μm filter cloth, and a finely divided dispersion having a solids content of 25.0% was obtained. The finely divided dispersion had a residual monomer content of 80 mg/kg of styrene, 90 mg/kg of n-butyl acrylate and 50 mg/kg of tert-butyl acrylate. The turbidity value of a dispersion diluted to 2.5% was 0.63 (660 nm, 1 cm cell). The particle size was 74.5 nm (determined by laser correlation spectroscopy as described in WO 99/42490 A1).

Testing of Performance Characteristics of Polymer Dispersions Obtained According to the Examples and the Comparative Examples An aqueous solution of a degraded corn starch was adjusted to the desired concentration. The dispersions of the examples and comparative example which were to be tested were then metered into the starch solution so that the size press liquor comprised 100 g/l of a degraded corn starch and 1-3 g/l of the respective dispersion. The mixture of starch solution and polymer dispersion was then applied by means of a size press to a paper having a grammage of 80 g/m², which was slightly presized in the pulp with AKD (alkyldiketene), at a temperature of 50° C. The uptake of the preparation was in the region of about 45%. Thereafter, the papers thus treated were dried by means of contact drying at 90° C., conditioned for 24 h at 50% atmospheric humidity and then subjected to the tests.

The test paper used was a paper which was slightly presized in the pulp with AKD and had the following composition: fiber composition (80% of bleached birch sulfate pulp and 20% of bleached pine sulfate pulp) having a filler content of 19% (Hydrocarb® 60ME from Omya)

For determining the degree of sizing of the surface-sized papers, the $Cobb_{60}$ value according to DIN EN 20 535 was determined. The water absorbing of the paper sheet in g/m² after contact with water and a contact time of 60 s is defined as the $Cobb_{60}$ value. The lower the $Cobb_{60}$ value, the better is the sizing effect of the dispersion used. The HST value was determined by the Hercules Sizing Test according to Tappi standard T 530. The higher the HST value, the better is the sizing effect of the dispersion used. The results of the tests are summarized in table 1.

TABLE 1

Results of testing of the performance characteristics

| Amount applied [g/l] | $Cobb_{60}$ value [g/m²] | | | HST value [s] | | |
|---|---|---|---|---|---|---|
| | 1 | 2 | 3 | 1 | 2 | 3 |
| Example 1 | 69 | 41 | 27 | 11 | 81 | 1411 |
| Comparative example 1 | 74 | 57 | 33 | 3 | 26 | 160 |
| Example 2 | 70 | 37 | 26 | 14 | 92 | 139 |
| Comparative example 2 | 79 | 67 | 56 | 4 | 16 | 67 |
| Example 3 | 66 | 30 | 26 | 22 | 108 | 139 |
| Comparative example 3 | 77 | 59 | 28 | 7 | 38 | 88 |
| Example 4 | 62 | 27 | 25 | 40 | 110 | 153 |
| Comparative example 4 | 72 | 51 | 30 | 5 | 51 | 121 |
| Example 5 | 58 | 30 | 23 | 36 | 116 | 157 |
| Comparative example 5 | 62 | 32 | 25 | 21 | 106 | 153 |
| Example 6 | 66 | 56 | 31 | 10 | 40 | 90 |
| Comparative example 6 | 68 | 62 | 53 | 5 | 18 | 53 |
| Example 7 | 62 | 33 | 26 | 19 | 88 | 121 |
| Comparative example 7 | 64 | 56 | 32 | 8 | 40 | 115 |
| Example 8 | 63 | 29 | 26 | 18 | 104 | 135 |
| Comparative example 8 | 61 | 33 | 27 | 17 | 78 | 128 |
| Example 9 | 81 | 47 | 38 | 47 | 109 | 156 |
| Comparative example 9 | 85 | 58 | 40 | 31 | 54 | 77 |
| Example 10 | 73 | 49 | 37 | 56 | 96 | 174 |
| Comparative example 10 | 67 | 59 | 39 | 55 | 85 | 152 |
| Comparative example A | 73 | 39 | 32 | 10 | 70 | 95 |
| Comparative example B | 73 | 62 | 37 | 4 | 18 | 73 |
| Comparative example C | 78 | 74 | 71 | 2 | 4 | 13 |
| Comparative example D | 74 | 50 | 34 | 7 | 52 | 120 |
| Comparative example E | 70 | 37 | 31 | 13 | 91 | 139 |

From the examples according to the invention, it is clear that both a substantially lower $Cobb_{60}$ value and a higher HST value are achieved in comparison with the corresponding comparative examples without terpene-containing chain-transfer agent, and the papers produced therewith thus shown an improved sizing effect. This effect increases significantly with the amount of the respective polymer dispersion applied. A substantially improved sizing effect is also achieved in comparison with the polymer dispersions known from the prior art.

The invention claimed is:

1. A finely divided, starch-comprising polymer dispersion obtained by free radical emulsion polymerization of ethylenically unsaturated monomers in the presence of at least one redox initiator and a starch,
wherein the ethylenically unsaturated monomers comprise:
(a) 40 to 50% by weight of an optionally substituted styrene,
(b) 5 to 25% by weight of a $C_1$-$C_4$-alkyl acrylate, and
(c) 0.1 to 5% by weight of another ethylenically unsaturated copolymerizable monomer, and the starch is
(d) 25 to 35% by weight of at least one degraded anionic starch having a molar mass $M_w$ of 2,500 to 35,000 g/mol,
wherein a sum (a)+(b)+(c)+(d) is 100% and is based on a total solids content, and the polymerization is performed in the presence of at least 0.01% by weight, based on a content of the monomers used, of at least one chain-transfer agent comprising terpinolene.

2. The polymer dispersion of claim 1, wherein the polymerization is performed in the presence of 0.01 to 10% by weight, based on a content of the monomers, of the chain-transfer agent.

3. The polymer dispersion of claim 1, wherein the polymerization is performed in the presence of 0.05 to 5% by weight, based on a content of the monomers, of the chain-transfer agent.

4. The polymer dispersion of claim 1, wherein the chain-transfer agent consists of terpinolene.

5. The polymer dispersion of claim 1, wherein the optionally substituted styrene is selected from the group consisting of α-methylstyrene, styrenes halogenated on the ring, C1-C4-alkyl-substituted styrenes, styrene and mixtures thereof.

6. The polymer dispersion of claim 1, wherein the ethylenically unsaturated monomers comprise (a) 40 to 50% by weight of styrene.

7. The polymer dispersion of claim 1, wherein the $C_1$-$C_4$-alkyl acrylate comprises at least one member selected from the group consisting of methyl acrylate, ethyl acrylate, n-propyl acrylate, isopropyl acrylate, n-butyl acrylate, isobutyl acrylate, tert-butyl acrylate and sec-butyl acrylate.

8. The polymer dispersion of claim 1, wherein the $C_1$-$C_4$-alkyl acrylate comprises at least one member selected from the group consisting of n-butyl acrylate, sec-butyl acrylate, isobutyl acrylate and tert-butyl acrylate.

9. The polymer dispersion of claim 1, wherein said another ethylenically unsaturated copolymerizable monomer comprises at least one member selected from the group consisting of vinyl acetate, vinyl propionate, hydroxyethyl acrylate, hydroxyethyl methacrylate, N vinylformamide, acrylamide, methacrylamide, N-vinylpyrrolidone, N-vinylimidazole, N-vinylcaprolactam, acrylic acid, methacrylic acid, acrylamidomethylpropanesulfonic acid, styrenesulfonic acid, vinylsulfonic acid and salts of the monomers comprising acid groups.

10. The polymer dispersion of claim 1, wherein said another ethylenically unsaturated copolymerizable monomer comprises at least one member selected from the group consisting of dialkylaminoalkyl (meth)acrylates and dialkylaminoalkyl(meth)acrylamides.

11. The polymer dispersion of claim 1, wherein said another ethylenically unsaturated copolymerizable monomer comprises at least one member selected from the group consisting of vinyl esters of linear or branched $C_1$-$C_{30}$-carboxylic acids.

12. The polymer dispersion of claim 1, comprising dispersed particles having a mean particle size of 20 to 500 nm.

13. The polymer dispersion of claim 1, comprising dispersed particles having a mean particle size of 50 to 250 nm.

14. The polymer dispersion of claim 1, having a solids content of 5 to 50% by weight.

15. The polymer dispersion of claim 1, having a solids content of 15 to 40% by weight.

16. A process for preparing the polymer dispersion of claim 1, comprising polymerizing (a), (b), (c) and (d), wherein a sum (a)+(b)+(c)+(d) is 100% and is based on a total solids content, in the presence of a redox initiator in an aqueous medium and in the presence of at least 0.01% by weight, based on a content of the monomers used, of at least one chain-transfer agent comprising terpinolene.

17. The process of claim 16, wherein the chain-transfer agent consists of terpinolene.

18. The process of claim 16, further comprising, after the polymerization,
    adding at least one initiator selected from the group consisting of hydrogen peroxide, a peroxide, a hydroperoxide and an azo initiator to the polymer dispersion, and performing a postpolymerization.

19. The process of claim 18, wherein the initiator is tert-butyl hydroperoxide.

20. A method of sizing paper, board, or cardboard, comprising contacting a sizer comprising the dispersion of claim 1 with paper, board or cardboard.

* * * * *